208-296
✓ Exami
March 3, 1936. A. LACHMAN Re. 19,879
PROCESS OF REFINING HYDROCARBON OILS Orig. 1,809,170
Original Filed May 8, 1929
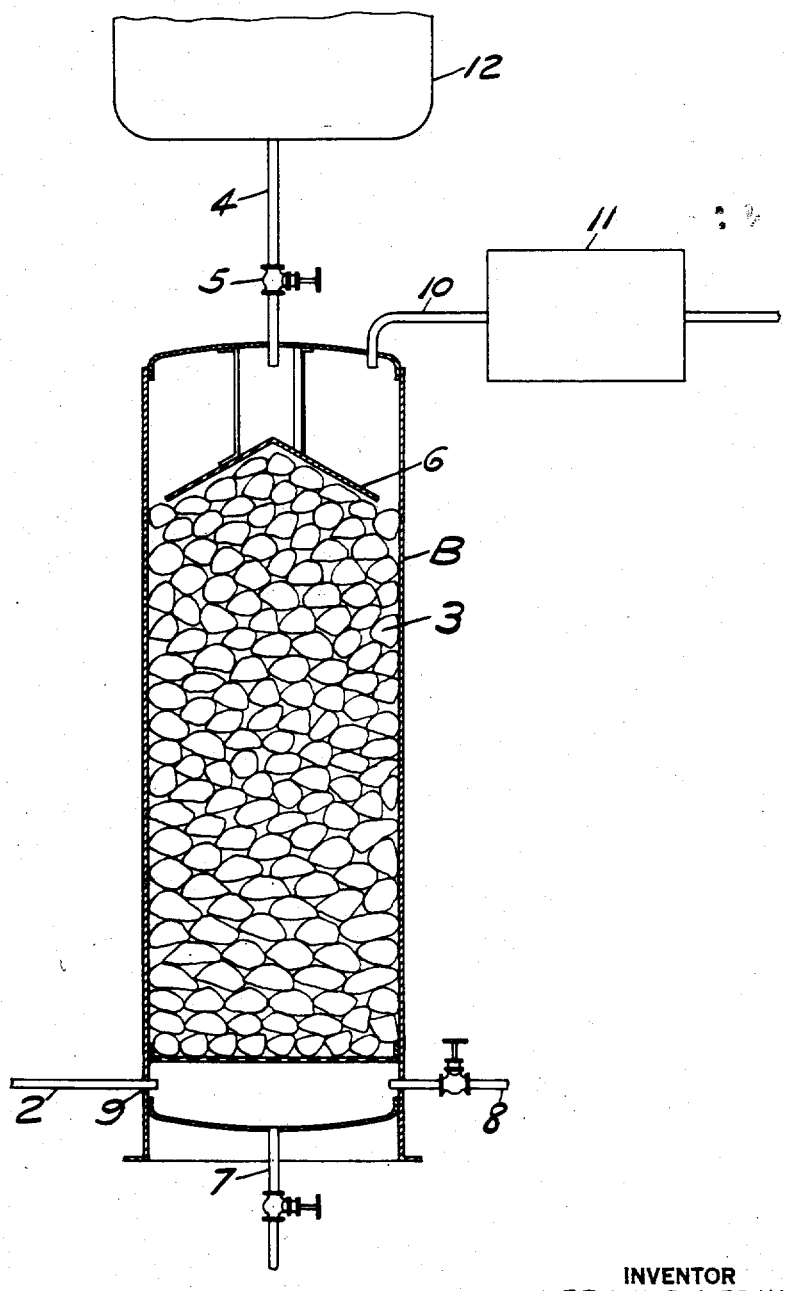
INVENTOR
ARTHUR LACHMAN.
BY
Marvin L. Chappell
ATTORNEY

36

Exami

Reissued Mar. 3, 1936

Re. 19,879

UNITED STATES PATENT OFFICE 19,879

PROCESS OF REFINING HYDROCARBON OILS

Arthur Lachman, Berkeley, Calif., assignor, by mesne assignments, to Vapor Treating Processes, Inc., a corporation of California Original No. 1,809,170, dated June 9, 1931, Serial No. 361,513, May 8, 1929. Application for reissue June 8, 1933, Serial No. 674,969

20 Claims. (Cl. 196—36)

This invention relates to a process of purifying and refining hydrocarbon oils obtained by distillation or cracking of mineral oils, such as lubricating oils, lamp oils, gasoline stocks or distillates derived from oil shale. This application is a continuation in part of my pending application Serial No. 200,589, filed June 22, 1927 for method of refining mineral oils, which consists of a similar method or process for purifying and refining mineral oil products with a water solution of zinc chloride.

The process of refining hydrocarbon oils, as described in this application, is applicable to all mineral oil products derived by distillation or cracking operations, such as lubricating oils, lamp oil stocks, gasoline stocks, distillates derived from oil shale, etc., and is particularly adaptable to gasoline stocks obtained by cracking higher boiling hydrocarbon oils. For the purpose of simplifying the description, reference will be made to gasoline only.

Crude gasoline stocks obtained by distilling or cracking petroleum oils consist of a mixture of saturated and unsaturated hydrocarbons together with sulphur compounds, nitrogen bases and other substances of an undefined nature. These latter substances are readily oxidizable at ordinary temperatures and are usually responsible for the change of color which takes place when refined gasoline is stored. These oxidizable substances are removed with difficulty when gasoline stocks are treated by the methods known in common use.

In order to show the nature of my invention, it is desirable to describe the method now in common use in oil refineries, and particularly that step of refining gasoline stocks which consists in deodorizing and stabilizing the same. Crude gasoline stocks obtained by distillation of crude petroleum oil or by cracking a higher boiling petroleum oil, are customarily treated with approximately from 1 per cent to as high as 8 per cent by weight sulphuric acid, the quantity of sulphuric acid depending upon the nature of the gasoline stock to be treated and the product desired. This acid treatment usually consists in commingling the gasoline stock with the required amount of sulphuric acid necessary to obtain the desired extraction, either by the well-known batch or continuous treatment, after which the products of the acid reaction are permitted to settle and then withdraw from the treated gasoline stock. The acid treated gasoline stock is then neutralized by washing with a water solution of an alkali and finally with water. This treatment removes most of the impurities, but subsequent treatments are usually necessary to deodorize and remove or convert corrosive sulphur compounds into non-corrosive bodies. For this purpose, a water solution of sodium plumbite or sodium hypochlorite is usually employed to render the gasoline "sweet" to the "doctor test".

The general objections to a treatment of this character are as follows:

(1) Gasoline purified by this method frequently becomes discolored when stored for a period of time;

(2) Considerable quantities of sulphuric acid are required, which are difficult to recover;

(3) As high as 10 per cent of the valuable stable unsaturated hydrocarbons contained in the gasoline stock may be lost; and (4) The treatment must frequently be followed by a deodorizing or sweetening process, such as that heretofore described.

Now, I have discovered that the sulphuric acid normally used to treat crude gasoline stocks may be reduced to a high extent, and in many cases may be entirely eliminated by the employment of a water solution of certain metallic salts, or mixtures of the same, which may be zinc, copper, cadmium, mercury, iron, chromium, manganese, aluminum, nickel or cobalt water soluble salts, such as the chloride, bromide, iodide, sulphate, nitrate, and also any of the water soluble salts of the above named metals of organic acids, such as the sulphonic acids of benzol, toluol and xylol, or the sulphonic acids derived from the treatment of petroleum oils with sulphuric acid.

The process described briefly consists in passing the hydrocarbon oil product such as gasoline stock while in a vapor state, through or in contact with a hot concentrated water solution of any of the aforesaid metallic salts or mixtures thereof. The gasoline stock so treated is usually pure enough for immediate use, although it sometimes may contain small amounts of hydrogen sulphide, which may be removed by washing with an alkaline solution of sodium or calcium hydroxide, or the carbonates of sodium or potassium.

The hydrocarbon oil stock to be treated by my invention may or may not have had a preliminary treatment with sulphuric acid, or other agents to partly purify the same, or may be first partly purified by my invention and the purifications completed by methods known in the art, such as treatment with caustic alkali, sulphuric acid, etc. In case of gasoline stocks produced by cracking high sulphur bearing crude petroleum oils or residuums, it may be advantageous to treat such gasoline stocks with small amounts of sulphuric acid before the treatment with a concentrated water solution of any of the afore-stated metallic salts, which may also be followed by treatment with an alkaline water solution of sodium, potassium or calcium hydroxide, or the carbonates of sodium or potassium.

Although a solution of less concentration may be employed which may range from 50 or less to approximately 85 per cent, the strength of the water solution of the metallic salt or mixture of salts employed is preferably a substantially concentrated solution, and the temperature employed for the treatment is approximately 300 to 400 degrees F., which normally fluctuates, depending upon the vaporizing temperature of the oil under treatment, it being, of course, understood that these ranges of concentration and temperature are not to be taken as limiting the present invention, because some stock may be hereafter encountered which will be best treated in accordance with the broad principles of my invention by varying the concentrations and temperatures from the figures given, and yet such departure would not remove such practice from the protection of the appended claims.

With the foregoing preliminary explanation, the preferred embodiment of my invention will now be more fully explained by reference to the accompanying drawing which is a diagrammatic view of one form of apparatus which may be employed for carrying out the objects of the present invention.

Referring to the drawing, 2 indicates a pipe leading to a source of crude gasoline vapors not shown, such as a fractionating tower employed to separate the lower boiling oils from the higher boiling oils. B indicates a tower of suitable height and diameter filled with resistant or contact material, such as fire brick, spiral tile or the like, indicated at 3, which forms numerous tortuous passages through the tower, although it is to be understood that the well-known bubble cap contact tower may be employed. Disposed above the tower or adjacent to the same, is a tank 12 containing a substantially concentrated water solution of a metallic salt or mixtures of the same, as heretofore enumerated, or equivalents thereof, having a concentration of from 50 per cent or less to as high as approximately 85 per cent. This tank is connected to the top of the tower by means of a pipe 4 having a regulating valve 5. This pipe terminates over a spreader plate 6 and this plate evenly distributes the water solution of the metallic salt or salts when the valve 5 is opened, over the brick work or contact material. The water solution of the metallic salt or salts flows downward through this contact material and may finally be discharged through the bottom by a pipe 7, after which it is treated for recovery. The tower B is also provided with a steam or water inlet pipe 8, which intermittently or continuously supplies a predetermined amount of water or steam to the tower. The hot gasoline vapors from the pipe 2 enter the lower end of the tower B at a point 9. The oil vapors pass up through the numerous contact passages in the brick work and thereby come into intimate contact with the said water solution of metallic salt or salts flowing over the same. Although other temperatures may be employed, both the water solution of metallic salt or salts and oil vapors are generally maintained at a temperature of approximately 300 to 400 degrees F., and the oil vapors are discharged at the upper end of the tower through a pipe 10 which is connected with a condenser 11 of suitable construction. The gasoline vapors passing through the contact tower B at the temperature specified, vaporize a certain amount of water from the water solution of metallic salts and the purpose of the steam or water inlet pipe 8 is that of continuously maintaining the solution at a certain water content so as to maintain the necessary fluidity which is essential for good contact between the rising gasoline vapor and the down-flowing water solution of metallic salt or salts. Preferably the concentration of the water solution of metallic salt or salts is maintained at its predetermined limits of concentration by a continuous introduction of water or water vapor. Otherwise solid metallic salt or salts and solid sludge impurities may plug the passages through which the gasoline vapors are being conducted.

As a variant of the above-described process, the water solution of metallic salt or salts may contain hydroxides or oxides of any of the metals heretofore enumerated, or mixtures thereof, or their equivalents, before being introduced into the system. This may be accomplished by agitating the water solution of the metallic salt or salts with any of the hydroxides or oxides of any of the enumerated metals. The optimum amount of the metal oxide or hydroxide ranges from about ½ of 1 per cent to 3 per cent by weight of the water solution of metallic salt or salts. In explanation, when the oxides or hydroxides of any of the aforementioned metals or mixtures thereof are soluble in substantial amounts in the salt or salts solution at the temperatures and pressures employed, it is no doubt that the beneficial action will be enhanced but even if no substantial solubility exists, useful effects can be obtained if the oxides and hydroxides are suspended in the salt or salts solution.

The reaction tower B is kept full of the water solution of the metallic salt or salts containing metallic hydroxides or oxides such as zinc hydroxide, and a fresh supply of approximately 15 pounds of the said solution is admitted for each barrel of gasoline stock under treatment and a corresponding amount of the spent solution is withdrawn at the same time.

The amount of water vapor required to replace the vaporized water from the water solution of metallic salt or salts varies within wide limits, depending upon the concentration of the solution employed, the temperature at which the operation is carried out and the nature and amount of inert gases which may accompany the gasoline vapor being treated. Approximately 50 to 100 pounds of water or water vapor will usually be sufficient for each barrel of gasoline stock treated. By this treatment the major portion of the impurities contained by the gasoline stock is removed and carried out with the water solution of metallic salt or salts as a sludge and the purified gasoline vapors, when condensed, are suitable for use as a refined gasoline stock of high purity.

It will be observed that the enumerated metals may be classed as "heavy metals", and it will further be understood that the word "heavy" as used in the term "a maintained aqueous solution of a salt of a heavy metal" (which latter phrase with certain expressed limitations is embodied in the claims to comprehend the materials capable of use in the described process) includes those metals which form water soluble salt solutions capable of being maintained in solution at the temperatures and pressures at which the hereinbefore described process may be practiced.

While the process herein described is well adapted for carrying out the objects of the present invention, it is to be understood that various modifications and changes may be made without departing from the invention, such for example as the use of centrifugal or other mechanical mixers or the employment of any of the well-known contact towers wherein a water solution of a metallic salt or mixtures of metallic salts, either organic or inorganic, heretofore enumerated, or their equivalents, may be commingled with or brought into contact with a petroleum oil vapor at the reacting temperatures and the invention includes all such modifications and changes as come within the scope of the appended claims.

What I claim is:

1. The process of refining hydrocarbon oils which comprises vaporizing the oils and contacting the vapors with a maintained aqueous solution of a salt of a heavy metal (other than zinc chloride or any of the iodides) which is soluble in sufficient amounts at the temperature and pressure employed in the refining process to produce a treatment of the oils.

2. The process of refining hydrocarbon oils which comprises vaporizing the oils and contacting the vapors with a maintained aqueous solution of a heavy metal chloride (other than zinc chloride) which is soluble in sufficient amounts at the temperature and pressure employed in the refining process to eventuate a treating solution.

3. The process of refining hydrocarbon oils which comprises vaporizing the oils and contacting the vapors with a maintained aqueous solution of a heavy metal halide (other than zinc chloride or any of the iodides) which is soluble in sufficient amounts at the temperature and pressure employed in the refining process to eventuate a treating solution.

4. A process of refining mineral oils, comprising, vaporizing a mineral oil, contacting the vaporized oil with a water solution of a zinc salt (other than zinc-chloride or -iodide) maintained in solution and then condensing purified oil vapor separated from products of reaction and treating agent.

5. A process of refining mineral oils, comprising, vaporizing a mineral oil by the application of heat, contacting the heated vaporized mineral oil with a substantially concentrated solution of a zinc salt (other than zinc-chloride or -iodide) maintained in solution and then condensing purified oil vapor separated from products of reaction and treating agent.

6. A process of refining mineral oils, comprising, vaporizing a mineral oil, contacting the vaporized mineral oil with a water solution of a mixture of zinc salts (not however including zinc-chloride or -iodide) maintained in solution and then condensing purified oil vapor separated from products of reaction and treating agent.

7. A process of refining mineral oils, comprising, vaporizing a mineral oil by the application of heat, contacting the heated vaporized mineral oil with a heated water solution of a zinc salt (other than zinc-chloride or -iodide) maintained in solution and then condensing purified oil vapor separated from products of reaction and treating agent.

8. A process of refining mineral oils, comprising, vaporizing a mineral oil by the application of heat, contacting the heated vaporized mineral oil with a heated water solution of a zinc salt (other than zinc-chloride or -iodide) maintained in solution and heated to a temperature of not less than the vaporizing temperature of the vaporized mineral oil under treatment, and then condensing purified oil vapor separated from products of reaction and treating agent.

9. A process of refining mineral oils, comprising, heating a mineral oil to form a vapor at temperatures of approximately 300 to 400 degrees F., contacting the heated vapors with a water solution of a zinc salt (other than zinc-chloride or -iodide) maintained in solution at a substantially similar temperature and then condensing purified oil vapor separated from products of reaction and treating agent.

10. A process of refining mineral oils, comprising, heating a mineral oil to form a vapor at temperatures of approximately 300 to 400 degrees F., passing the heated vapors through or in contact with a water solution of zinc salts (other than zinc-chloride or -iodide) maintained in solution at a substantially similar temperature and having a concentration of approximately 50–85% and then condensing purified oil vapor separated from products of reaction and treating agent.

11. A process of refining mineral oils, comprising, heating a mineral oil to form a vapor, contacting the heated vapor with a water solution of zinc salts (other than zinc-chloride or -iodide) maintained in a fluid condition and containing zinc hydroxide, and then condensing purified oil vapor separated from products of reaction and treating agent.

12. A process of refining mineral oils, comprising, heating a mineral oil to form a vapor, passing the heated vapor through and in contact with a water solution of zinc salts (other than zinc-chloride or -iodide), maintaining the solution in a fluid condition by the addition of water and condensing the vapor after passing through the solution.

13. A process of refining mineral oils, comprising, commingling the vapors of a mineral oil with a water solution of a zinc salt (other than zinc-chloride or -iodide) maintained in a fluid condition and then condensing purified oil vapor separated from products of reaction and treating agent.

14. A process of refining mineral oils, comprising, heating a mineral oil to form a vapor, passing the heated vapors through and in contact with a water solution of a zinc salt (other than zinc-chloride or -iodide) containing zinc hydroxide, maintaining the solution in a fluid condition by the addition of water during contact of the vapors with the treating solution and condensing the vapor after passing through the solution.

15. A process of refining mineral oils, comprising, heating a mineral oil to form a vapor, passing the heated vapor through and in contact with a water solution of zinc salts (other than zinc-chloride or -iodide) containing from ½ of 1 per cent to 3 per cent by weight of zinc hydroxide and zinc oxide, maintaining the solution in a fluid condition by addition of water during contact of the vapors with the treating solution and condensing the vapor after passing through the solution.

16. A process of refining mineral oils, comprising, heating a mineral oil to form a vapor, passing the heated vapor through and in contact with a water solution of zinc salts (other than zinc-chloride or -iodide), maintaining the concentration of the solution within predetermined limits by the addition of water and condensing the vapors after passing through the solution.

17. A process of refining mineral oils, comprising, heating a mineral oil to form a vapor at temperatures of approximately 300 to 400 degrees F., passing the heated vapor through and in contact with a water solution of a zinc salt (other than zinc-chloride or -iodide) maintained at a similar temperature and having a concentration of approximately 50–85%, maintaining the concentration of the solution as specified by the continuous addition of water, and then condensing the vapor after passing through the solution.

18. A process of refining mineral oils, comprising, vaporizing a mineral oil, contacting the vaporized oil with a water solution of a zinc salt (other than zinc-chloride or -iodide), intermittently introducing water into the solution of zinc salt to maintain the aqueous solution and continuously condensing vapors of the purified mineral oil separated from the products of reaction and solution of zinc salt.

19. A process of refining mineral oils, comprising, heating a mineral oil to form a vapor, passing the vapor through and in contact with a water solution of zinc salts (other than zinc-chloride or -iodide) containing zinc hydroxide, intermittently introducing water into the solution of zinc salts to maintain the aqueous solution containing zinc hydroxide and continuously condensing the vapors of the purified mineral oil separated from the products of reaction and solution of zinc salts containing zinc hydroxide.

20. A process of refining mineral oils, comprising, heating a mineral oil to form a vapor, passing the vapor through and in contact with a water solution of a zinc salt (other than zinc-chloride or -iodide) containing zinc oxide, intermittently introducing water into the solution of zinc salt to maintain the aqueous solution containing zinc oxide and continuously condensing the vapor of the purified mineral oil separated from the solution of zinc salt containing zinc oxide and products of reaction.

ARTHUR LACHMAN.